(12) United States Patent
McCann et al.

(10) Patent No.: US 9,296,295 B2
(45) Date of Patent: *Mar. 29, 2016

(54) MACHINE CONTROL SYSTEM UTILIZING INERTIAL YAW SENSOR

(75) Inventors: Gerry O. McCann, Dunlap, IL (US); Yun Liu, Peoria, IL (US); Keith F. Harvey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/457,141

(22) Filed: Apr. 26, 2012

(65) Prior Publication Data

US 2012/0209484 A1 Aug. 16, 2012

Related U.S. Application Data

(63) Continuation-in-part of application No. 12/617,748, filed on Nov. 13, 2009.

(60) Provisional application No. 61/139,677, filed on Dec. 22, 2008, provisional application No. 61/480,720, filed on Apr. 29, 2011.

(51) Int. Cl.
*B60K 17/16* (2006.01)
*B60K 23/04* (2006.01)
(Continued)

(52) U.S. Cl.
CPC ............... *B60K 17/20* (2013.01); *B60K 23/04* (2013.01); *F16D 48/06* (2013.01); *B60K 28/165* (2013.01); *B60W 30/045* (2013.01); *B60W 2520/28* (2013.01); *B60W 2720/28* (2013.01); *B60Y 2200/14* (2013.01); *B60Y 2200/222* (2013.01);
(Continued)

(58) Field of Classification Search
CPC ............. B60K 23/04; B60W 2520/28; B60W 2720/28; F16D 2500/00; F16D 2500/10425; F16D 2500/10431; F16D 2500/3108; F16D 2500/3118; F16D 48/00; F16D 48/02; F16D 48/0206; F16D 48/06; F16D 48/062; F16D 48/064; F16D 48/066
USPC .............. 701/69–75, 82–85, 87–90; 180/245, 180/246, 248
See application file for complete search history.

(56) References Cited

U.S. PATENT DOCUMENTS 4,799,160 A * 1/1989 Arbeille et al. ................. 701/67
4,936,405 A 6/1990 Hrovat
(Continued)

FOREIGN PATENT DOCUMENTS

EP 2106952 7/2009

*Primary Examiner* — John Q Nguyen
*Assistant Examiner* — Jordan S Fei
(74) *Attorney, Agent, or Firm* — Finnegan, Henderson, Farabow, Garrett & Dunner, LLP

(57) ABSTRACT

An electronic traction optimization system includes a control unit adapted to produce a corner speed estimate signal for each wheel of a machine, produce an ideal target speed signal for each wheel having a value at least partially responsive to the corner speed estimate signals, produces a practical target speed signal for each wheel, generates an actual target speed signal having a value responsive to a comparison of the ideal target speed signal and the practical target speed signal for each wheel. The control unit compares each actual target speed signal to an associated wheel speed signal to obtain a wheel speed error signal for each wheel and converts each wheel speed error signal to a clutch control signal, wherein each differential clutch actuator is responsive to an associated clutch control signal.

22 Claims, 12 Drawing Sheets

(51) Int. Cl.
*F16D 48/06* (2006.01)
*B60W 30/045* (2012.01)
*B60K 28/16* (2006.01)

(52) U.S. Cl.
CPC ............... *F16D 2500/10425* (2013.01); *F16D 2500/10431* (2013.01); *F16D 2500/1112* (2013.01); *F16D 2500/3108* (2013.01); *F16D 2500/3118* (2013.01); *F16D 2500/508* (2013.01); *F16D 2500/70668* (2013.01)

(56) References Cited

U.S. PATENT DOCUMENTS

| | | | |
|---|---|---|---|
| 5,152,544 A * | 10/1992 | Dierker et al. | 280/432 |
| 5,301,781 A * | 4/1994 | Tischer et al. | 192/85.49 |
| 5,376,027 A * | 12/1994 | Hergenrather | 440/38 |
| 5,631,829 A | 5/1997 | Takasaki et al. | |
| 5,879,061 A * | 3/1999 | Koibuchi | 303/146 |
| 5,989,147 A | 11/1999 | Forrest et al. | |
| 6,360,154 B1 * | 3/2002 | Krenn et al. | 701/54 |
| 6,487,486 B1 | 11/2002 | Anderson | |
| 6,553,303 B2 | 4/2003 | Matsuno | |
| 6,584,398 B1 | 6/2003 | Erban | |
| 6,620,072 B1 | 9/2003 | Salg | |
| 6,631,320 B1 * | 10/2003 | Holt et al. | 701/83 |
| 6,865,470 B2 | 3/2005 | Ohtsu | |
| 6,878,085 B2 | 4/2005 | Matsuno | |
| 7,077,779 B2 | 7/2006 | Yoshioka et al. | |
| 7,195,579 B2 | 3/2007 | Claussen et al. | |
| 7,386,383 B2 * | 6/2008 | Yoneda et al. | 701/69 |
| 2002/0143457 A1 * | 10/2002 | Hellmann et al. | 701/93 |
| 2005/0161295 A1 * | 7/2005 | Nilsson et al. | 188/158 |
| 2006/0169564 A1 | 8/2006 | Krisher et al. | |
| 2006/0243502 A1 * | 11/2006 | Weber et al. | 180/65.3 |
| 2007/0275823 A1 * | 11/2007 | Motosugi et al. | 477/176 |
| 2007/0294017 A1 | 12/2007 | Joshi et al. | |
| 2008/0047794 A1 * | 2/2008 | Ogata et al. | 192/3.3 |
| 2008/0066567 A1 * | 3/2008 | Kobayashi et al. | 74/336 R |
| 2008/0182720 A1 * | 7/2008 | Kobayashi et al. | 477/175 |
| 2008/0217134 A1 * | 9/2008 | Popp et al. | 192/85 R |
| 2008/0312038 A1 * | 12/2008 | Nakagawa et al. | 477/175 |
| 2009/0127014 A1 | 5/2009 | Ushiroda et al. | |
| 2010/0161190 A1 | 6/2010 | McCann et al. | |
| 2010/0256887 A1 * | 10/2010 | Linda et al. | 701/82 |
| 2010/0268429 A1 | 10/2010 | Bruns et al. | |
| 2011/0257861 A1 | 10/2011 | Uematsu et al. | |

\* cited by examiner

MACHINE CONTROL SYSTEM UTILIZING INERTIAL YAW SENSOR

RELATED APPLICATIONS

This application claims the benefit of priority from U.S. Provisional Application No. 61/480,720, filed Apr. 29, 2011, the contents of which are expressly incorporated herein by reference. This application is a continuation-in-part application of U.S. application Ser. No. 12/617,748, filed on Nov. 13, 2009, which claims priority to U.S. Provisional Application 61/139,677, filed on Dec. 22, 2008, the contents of each of which are expressly incorporated herein by reference.

TECHNICAL FIELD

This disclosure generally relates to a machine control system and, more particularly, to a machine control system utilizing an inertial yaw sensor.

BACKGROUND

Mobile machines, for example on-highway vehicles or off-highway construction or mining equipment can be steered by their operators to follow a desired path. Conventional steering systems utilize wheels that swivel around pivot points that are close to ends of associated axles or, in many cases notional axles, where a conventional axle does not exist. These conventional steering systems allow changes to made to the wheel orientation with only limited torque input required from a corresponding steering actuator. Even when the machines are stationary, it is still usually possible for the operator to turn a steering wheel and affect orientation of the wheels.

Other steering arrangements are possible. For example, with off-highway articulated machines (ATs), a front portion of the AT swivels or articulates in relation to a rear portion of the AT. With this configuration, the machine's axles can be rigid and a pivot arrangement is not required for individual wheels. The wheels on the AT's front axle simply take on a different orientation to the wheels on the rear portion of the machine, because the entire solid front axle is pivoted along with the entire front portion of the machine. As another alternative arrangement, tracked machines typically steer by commanding different track speeds on left and right sides of the machine.

In some of these latter applications (e.g., in AT applications), rotational effort to articulate the machine can be a significant issue. It is clear that, for example with the AT being stationary, as the forward portion articulates to the left (rotates counter clockwise when viewed from above) the left front wheel will be rotating backwards and the right front wheel will be rotating forwards. Even through the front axle is typically a driven axle on these ATs, this wheel speed difference is accommodated for by the differential, which, for the most part, operates as a conventional open differential.

In any of the situations discussed above, speed differences arise due to the forward (or reverse) curvilinear motion of the machine, and in some cases, like in the AT application, wheel speed differences can also arise due to the articulation action. Conventionally steered vehicles or machines may not have this second component to a significant degree. Wheels of a mobile machine may also experience speed differences due to a loss of traction.

A machine's differential may be provided with one or more clutches that alter the normally open behavior of the differential to selectively control the speeds of the wheels. That is, the differential clutch may be used to limit or override the normal behavior of the differential to reduce wheel spin (i.e., to reduce a disproportionate speed of one wheel on an axle during acceleration) or wheel slip (i.e., to reduce skidding of one wheel during deceleration). During acceleration, for example, if one of the wheels of a wheel set loses traction and starts to spin, an open differential will normally transfer torque from the non-spinning wheel to the spinning wheel (during acceleration to equalize torque between the wheels), thereby limiting the overall driving torque delivered to the wheels and actually increasing spinning. Similarly, during deceleration, if one of the wheels loses traction and starts to skid, the open differential will normally transfer torque from the non-skidding wheel to the skidding wheel, thereby limiting the overall braking torque delivered to the wheels and actually increasing skidding. The differential clutch, however, can override the differential to increase the amount of torque transmitted to the non-spinning or non-skidding wheel.

Some differential clutches permit partial clutch engagement to allow greater control over the amount of torque delivered to the wheels. However, in order for these clutches to be operated effectively without negatively impact steering, a knowledge of the true ground speed of each wheel may be important. Other machine control systems can also benefit from knowledge of the true ground speed of each machine wheel. Examples of such systems include Anti-lock Braking Systems (ABS), Dynamic Stability Control (DSC) systems, and various steering control systems.

Existing traction control systems generally compare estimated wheel speeds across an axle and activate the differential clutch if the wheel speed difference is beyond a predetermined threshold. However, such control systems do not fully account for natural wheel speed differences that occur while steering or turning (i.e., conventional control systems do not account for articulation-induced wheel speed differences). In addition, such estimates are generally needed during worst-case condition, where wheel speeds are expected to deviate from ground speed.

The disclosed machine display system is directed to overcoming one or more of the problems set forth above and/or other problems of the prior art.

SUMMARY OF THE DISCLOSURE

According to one aspect of the disclosure, a method is provided of optimizing traction for a machine having a transmission operably coupled to a front axle and a rear axle, the front axle including a cross-axle differential and a differential clutch, the rear axle including a cross-axle differential and a differential clutch, each differential clutch including an actuator, and two wheels coupled to each of the front and rear axles. The method may include sensing a wheel speed of each wheel and responsively producing associated wheel speed signals and sensing an orientation of the machine and responsively producing a yaw rate signal. The method may further include producing a corner speed estimate signal for each wheel having a value responsive to the wheel speed signals and yaw rate signal, producing an ideal target speed signal having a value responsive to the corner speed estimate signal associated with each wheel, producing at least one practical target speed signal for each wheel having a value responsive to the wheel speed signals, deriving an actual target speed signal from the ideal target speed signal and the at least one practical target speed signal for each wheel, comparing each actual target speed signal to an associated wheel speed signal to obtain a wheel speed error signal for each wheel, and converting each wheel speed error signal to a clutch control signal, wherein each differential clutch actuator is responsive to an associated clutch control signal.

According to other aspects of the disclosure, an electronic traction optimization system is provided for a machine having a transmission operably coupled to a front axle and a rear axle, two wheels coupled to each of the front and rear axles, and a cross-axle differential disposed between each of the front and rear axles. The system may include a wheel speed sensor associated with each wheel and adapted to generate a wheel speed signal, an orientation sensor responsive to an orientation of the machine from which a yaw rate signal is derived, and a differential clutch associated with each differential, each differential clutch including a torque transfer mechanism configured to override the associated differential and an actuator configured to operate the torque transfer mechanism. The system may further include a control unit adapted to produce a corner speed estimate signal for each wheel having a value responsive to the wheel speed signals and yaw rate signal, produce an ideal target speed signal having a value responsive to the corner speed estimate signal associated with each wheel, produce at least one practical target speed signal for each wheel having a value responsive to the wheel speed signals, derive an actual target speed signal from the ideal target speed signal and the at least one practical target speed signal for each wheel, compare each actual target speed signal to an associated wheel speed signal to obtain a wheel speed error signal for each wheel, and convert each wheel speed error signal to a clutch control signal, wherein each differential clutch actuator is responsive to the clutch control signal.

According to further aspects of the disclosure, a machine is provided that may include a front axle including a left axle shaft, a right axle shaft, and a front axle differential disposed between the left and right axle shafts, a rear axle including a left axle shaft, a right axle shaft, and a rear axle differential disposed between the left and right axle shafts, a wheel attached to each axle shaft, a main power source for generating torque, and a transmission coupled to the main power source for receiving the torque and having a transmission output shaft operably coupled to the front and rear axles. The machine may further include a front axle differential clutch operably coupled to the front axle differential, the front axle differential clutch including a torque transfer mechanism configured to override the front axle differential, and an actuator operably coupled to the torque transfer mechanism, and a rear axle differential clutch operably coupled to the rear axle differential, the rear axle differential clutch including a torque transfer mechanism configured to override the rear axle differential, and an actuator operably coupled to the torque transfer mechanism. A wheel speed sensor may be associated with each wheel and adapted to generate a wheel speed signal, and an orientation sensor may be responsive to an orientation of the articulated truck from which a yaw rate signal is derived. The machine may further include a control unit adapted to produce a corner speed estimate signal for each wheel having a value responsive to the wheel speed signals and yaw rate signal, produce an ideal target speed signal having a value responsive to the corner speed estimate signal associated with each wheel, produce at least one practical target speed signal for each wheel having a value responsive to the wheel speed signals, derive an actual target speed signal from the ideal target speed signal and the at least one practical target speed signal for each wheel, compare each actual target speed signal to an associated wheel speed signal to obtain a wheel speed error signal for each wheel, and convert each wheel speed error signal to a clutch control signal, wherein each differential clutch actuator is responsive to the clutch control signal.

DETAILED DESCRIPTION

Figure 1:
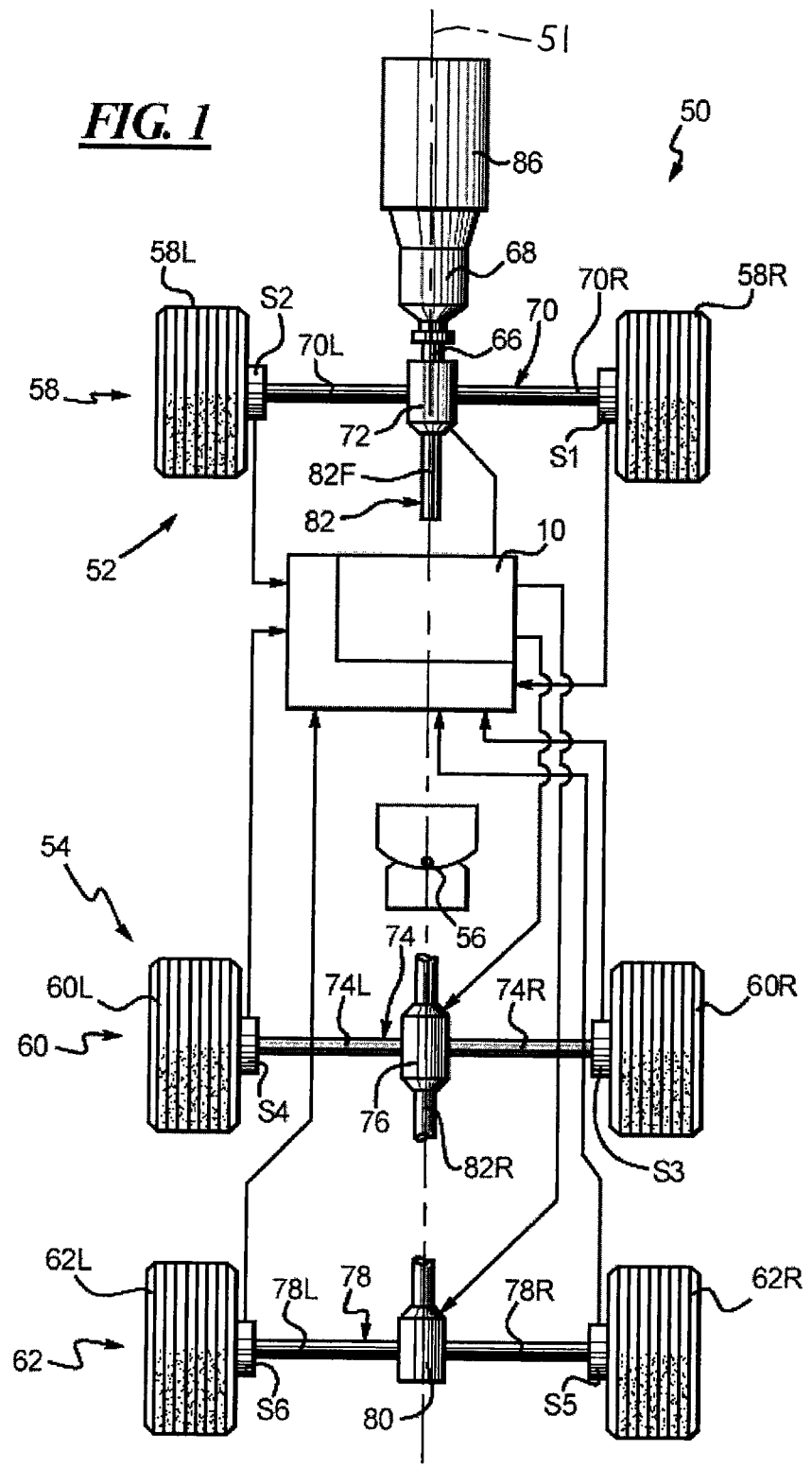
FIG. 1 is a schematic diagram of an articulated machine having a traction optimization system according to the present disclosure.

Referring now to the drawings, and with specific reference to FIG. 1, a machine constructed in accordance with this disclosure is generally referred to by reference numeral 50. The machine 50 includes a differential clutch controller that may be optimized to reduce wheel spin during acceleration and wheel slip during deceleration. While the machine 50 is depicted as an articulated truck, it is to be understood that the teachings of this disclosure can be applied to any number of different types of wheeled machines used in construction, transportation, agriculture, and industry. For example, the machine may be a motor grader, wheel harvester, rotary mixer, wheel skidder, four-wheel drive vehicle, quarry construction truck, large mining truck, wheel loader, wheel tractor scraper, or other machine.

As shown, the machine 50 includes a front cab 52 and a rear dump body 54 hinged together by an articulation joint 56. The articulation joint 56 permits relative movement about a vertical axis, enabling the machine 50 to be steered. The front cab 52 includes a front wheel set 58, while the rear dump body 54 includes a center wheel set 60 and a rear wheel set 62. Each wheel set includes at least one left wheel and one right wheel. In the illustrated embodiment, therefore, the front wheel set 58 includes a front left wheel 58L and a front right wheel 58R; the center wheel set 60 includes a center left wheel 60L and a center right wheel 60R; and the rear wheel set 62 includes a rear left wheel 62L and a rear right wheel 62R.

A lower drive assembly operably couples the wheels to a transmission 68. In the embodiment illustrated in FIG. 1, the lower drive assembly includes a series of axle sets and differentials. Accordingly, a front axle set 70 includes left and right half-axles 70L, 70R coupled by a front differential 72. A center axle set 74 includes left and right half-axles 74L, 74R coupled by a center differential 76. Finally, a rear axle set 78 includes left and right half-axles 78L, 78R coupled by a rear differential 80. The front, center, and rear axle sets 70, 74, 78 may be operably coupled to a drive shaft 82, which in turn is coupled to an output shaft 66 of the transmission 68. As is generally known, the front, center, and rear differentials 72, 76, 80 allow side-to-side or cross-axle wheel speed differences, which equalizes the torque delivered to each wheel of an axle and improves steering through corners.

Figure 3:
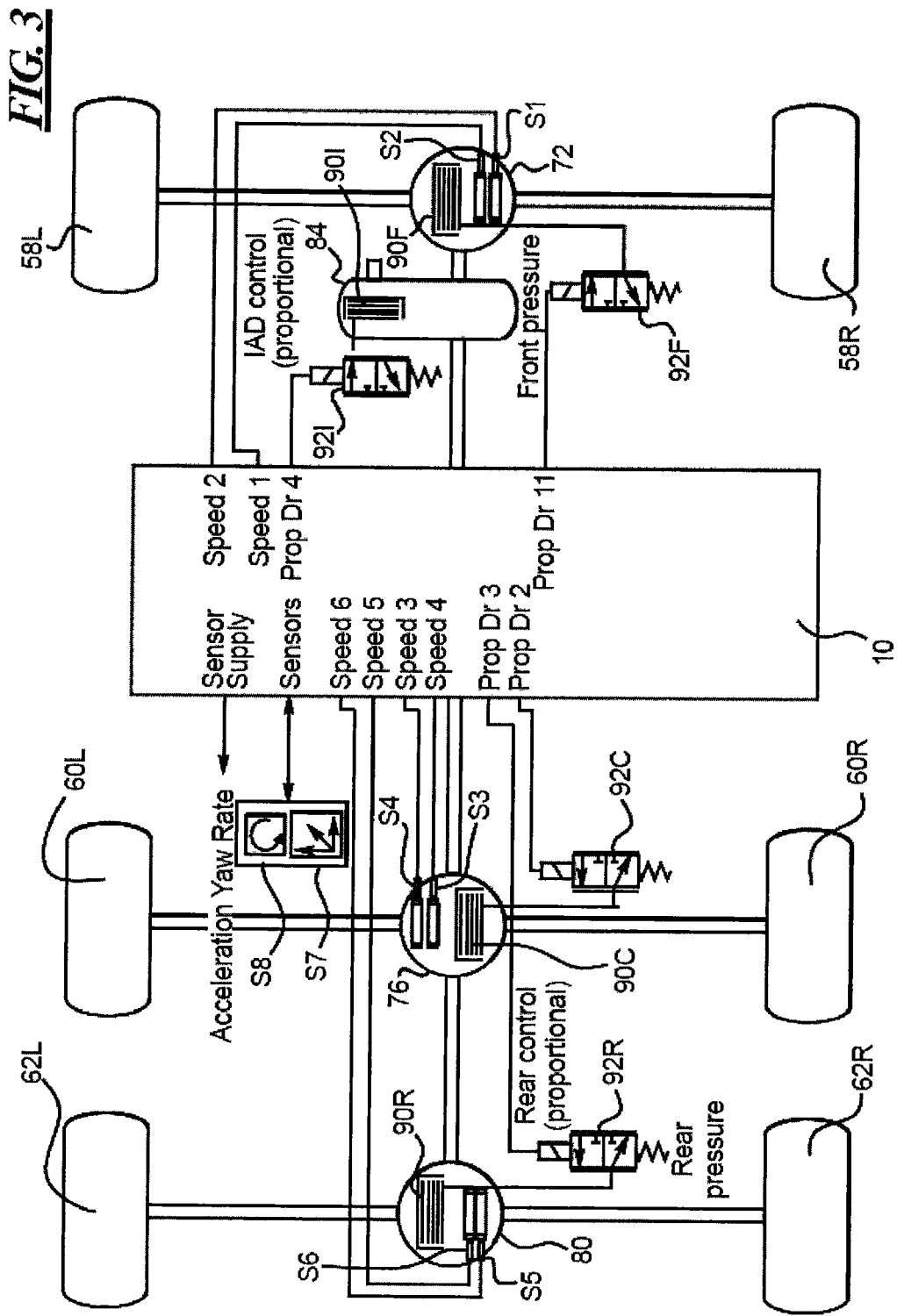
FIG. 3 is a schematic diagram of a machine showing additional details of the traction optimization system.

The drive shaft may include a front section 82F and a rear section 82R operably coupled by an inter-axle differential 84 (FIG. 3). The inter-axle differential 84 permits different wheel speeds between the front axle set 70 and the center and rear axle sets 74, 78. The transmission 68 may be operatively coupled to a main power source 86 for generating torque.

Figure 2:
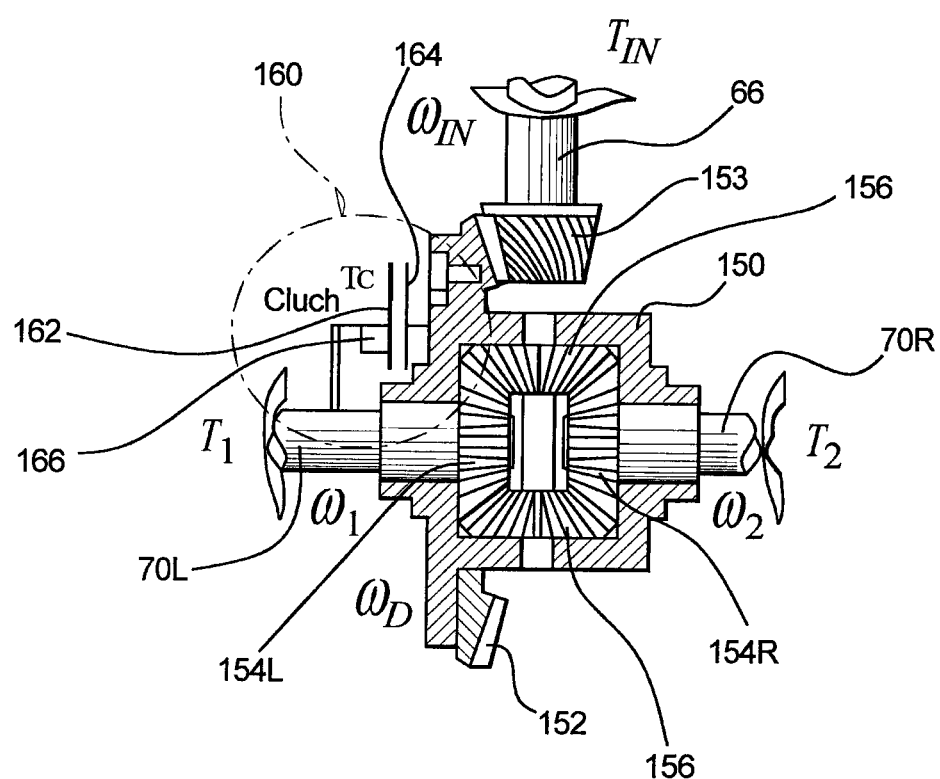
FIG. 2 is an enlarged schematic of a differential having a differential clutch.

FIG. 2 illustrates in greater detail an exemplary embodiment of the front differential 72. The front differential 72 includes a housing 150. A ring gear 152 may be attached to the housing 150 and configured to engage a pinion gear 153 disposed on the end of the transmission output shaft 66. Spider gears 156 may be disposed inside and rotate with the housing 150. The spider gears 156 engage left and right side gears 154L, 154R coupled to the left and right half-axles 70L, 70R, respectively. During normal operation, the left and right half-axles 70L, 70R rotate at equal rotational speeds in response to rotation of the housing 150. When the machine is turning or the wheels experience different levels of traction, the spider gears 156 rotate to allow the wheels to rotate at different speeds.

A lockup mechanism, such as a differential clutch 160, may be provided to override the differential 72, thereby creating direct engagement between the ring gear 152 and the left and right half-axles 70L, 70R. The differential clutch 160 may include a torque transfer mechanism, such as clutch plates, to override the normal, open operation of the differential. In the illustrated embodiment, the differential clutch 160 includes a first clutch plate 162 coupled to the left half-axle 70L and a second clutch plate 164 coupled to the ring gear 152. A piston 166 may be configured to apply engagement pressure to the clutch plates 162, 164, thereby selectively engaging the clutch. The degree to which the clutch is engaged will determine the amount of torque across the clutch, and therefore the torque differential between the half-axles, which in turn controls the amount of torque delivered to the wheels 58L, 58R (FIG. 1). When fully engaged, the clutch 160 attempts to equalize the wheel speeds, with arbitrary torque differences determined primarily by the surface friction conditions on each side of the machine, and also by whether the machine is moving in a straight line or turning.

While FIG. 2 illustrates a clutch 160 having clutch plates 162, 164, it will be appreciated that other lockup mechanisms may be used. For example, a clutch having dogs or other torque transfer mechanisms may be used.

Returning to FIGS. 1 and 3, the center differential 76, rear differential 80, and inter-axle differential 84 may be similar to the front differential 72 described above. Furthermore, each differential may be provided with a lock-up mechanism, such as a clutch, to override the differential. Accordingly, the machine 50 may have a front differential clutch 90F, a center differential clutch 90C, a rear differential clutch 90R, and an inter-axle differential clutch 90I. The front, center, and rear clutches 90F, 90C, 90R facilitate mobility in situations where there are variations in surface friction from side to side, while the inter-axle clutch 90I facilitates mobility in situations where the surface friction varies from front to rear. The inter-axle clutch 90I also improves mobility when the machine 50 encounters a steep grade, in which the load weight transfers from front to rear. In the exemplary embodiment, these differential clutches are hydraulically actuated, and therefore include respective valves 92F, 92C, 92R, and 92I for controlling the amount of hydraulic fluid delivered to the clutch pistons, thereby to control the amount of engagement pressure applied to the clutch plates. Alternatively, the differential clutches may be actuated using other means, such as air.

A controller is provided for generating clutch control signals for each hydraulic valve 92F, 92C, 92R, 92I, to thereby partially or fully engage the differential clutches 90F, 90C, 90R, 90I. FIG. 3 shows a schematic of an exemplary electrical system for the machine 50. The electrical system provides a central control unit 10 and a plurality of sensors and/or monitors for determining the dynamics of the vehicle at any particular point in time. The central control unit 10 receives feedback from the sensors and generates control signals for each hydraulic valve associated with a differential clutch. By controlling differential clutch engagement, the central control unit 10 may reduce wheel spin or slip in the event one or more wheels encounter a low traction surface.

Multiple sensors may be used to provide feedback to the central control unit 10. In the exemplary embodiment, the electrical system includes six wheel speed sensors S1-S6. The wheel speed sensors S1-S6 may detect the rotational velocity of the wheels directly, or may sense parameters from which wheel speeds may be inferred. One example of indirectly detecting wheel speed would be to provide sensors that measure the rotational velocity of components coupled to the wheels, such as components of a differential. One sensor may detect the speed of a differential side gear, such as side gear 154L. Another sensor may detect the speed of the input, such as ring gear 152. The ring gear speed is equal to the average of the two side gear speeds. Accordingly, the speed of side gear 154R may be determined by subtracting the speed of the left side gear 154L from twice the speed of the ring gear 152. The side gears 154L, 154R are directly coupled to the half axles carrying the wheels, and therefore their speeds may be used to infer the actual wheel speeds. Suitable proportional factors may be used to account for any reduction gear arrangements used between the half-axles and the wheels.

It may be possible to eliminate one or more of the wheel speed sensors S1-S6 in certain applications. In the illustrated articulated truck, for instance, the wheel speed sensors for one of the central or rear axles may be omitted, in which case the clutches for both the sensed and un-sensed axles would be controlled in common. Eliminating sensors from the center or rear axles may slightly reduce overall controller performance, but also reduce costs.

A yaw rate or inertial sensor S8 may be provided for generating information regarding a movement of the machine in a horizontal direction. Yaw rate sensor S8 may generate signals representing one or more aspects of an instantaneous change of the sensor's velocity and orientation in relation to an inertial frame of reference. In one embodiment, yaw rate sensor S8 may include 0-3 axis of acceleration sensing and 0-3 axis of rotational rate sensing. Yaw rate sensor S8 may be connected to a portion of the machine for which movement information is desired. In the disclosed embodiment, yaw rate sensor S8 is connected to the machine at a left/right center location over front axle set 70. When located at the left/right center of the axle set 70, there should be little, if any, "bleed" of yaw motion to the various acceleration axis. If yaw rate sensor S8 was instead located off the left/right center of the axle set 70 (i.e., off the axis of rotation), bleed of the rotation to longitudinal and lateral acceleration axes in the form of centripetal acceleration could occur. It should be noted, however, that yaw rate sensor S8 may be located anywhere on front cab 52, if desired, as front cab 52 is a relatively rigid body and should have a similar rate of rotation at any point. For an articulated truck, the yaw rate sensor S8 may measure the yaw rate of the front cab 52, from which the yaw rate of the rear dump body 54 may be estimated if needed. Alternatively, the machine may include a second yaw rate sensor for measuring yaw rate of the rear dump body 54.

The use of a yaw rate sensor S8, may be advantageous over the articulation angle sensors used in conventional articulated machines. If an articulation angle sensor is used, relative wheel speeds from front to back and side to side may be determined using machine geometry. These calculations, however, may assume that the machine is not sliding, or may be modified to allow for some estimated amount of sliding. A yaw rate sensor, however, directly provides the relative ground speed of each wheel without needing to consider machine geometry or whether the machine is sliding.

Figure 10:
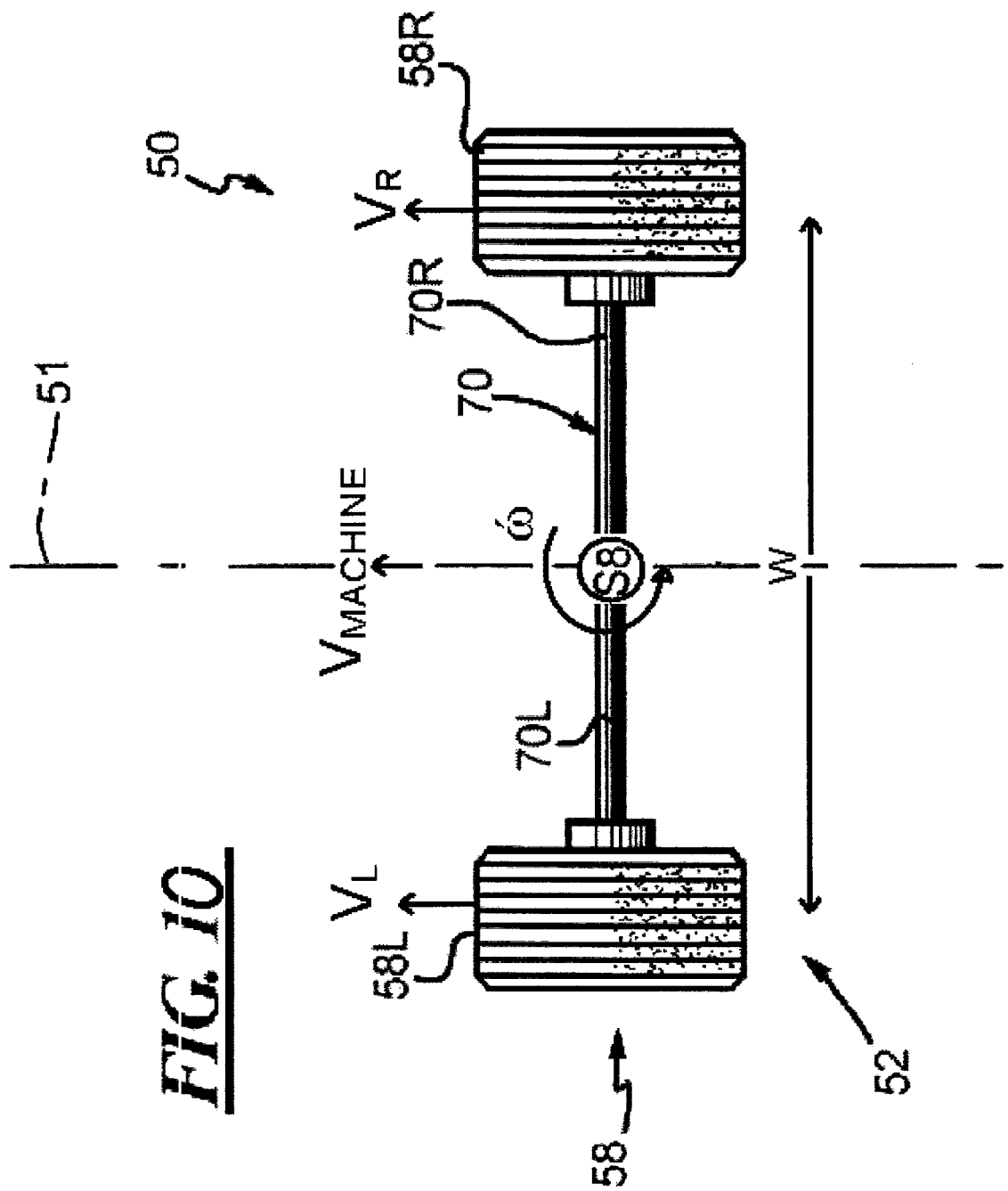
FIG. 10 is a free-body diagram of an inertial yaw sensor used to determine true grounds speeds for the articulated machine of FIG. 1.

With reference to FIG. 10, a difference in ground speeds between wheels of the same axle set may be determined based on signals from yaw rate sensor S8 via the following equation:

$$V\Delta = \omega' \times W$$

wherein:
   V∆ is the ground speed difference between opposing wheels;
   ω' is the yaw rate value (Rad/s) of the signal from sensor S8; and
   W is the track width between points of interest on opposing wheels.

Assuming that an estimate of overall machine speed is available through any combination of wheel speed and acceleration sensors, a speed at any point on the machine, for example at the center point of the left front wheel 58L or right front wheel 58R, may be determined through the following equations:

$$V_L = V_{MACHINE} - \omega' \times \frac{W}{2}$$

$$V_R = V_{MACHINE} + \omega' \times \frac{W}{2}$$

wherein:
   VR is the center point ground speed of 58R;
   VL is the center point ground speed of 58L;
   $V_{MACHINE}$ is the ground speed of the machine;
   ω' is the yaw rate value (Rad/s) of the signal from sensor S8; and
   W is the track width between points of interest on opposing wheels.

It should be noted that the above equations may hold true even when the machine is sliding. It should also be noted that the velocities discussed above may be determined for a point on the machine other than the center points of the left and right front wheels through the use of these equations simply by replacing the track width term with a left/right horizontal distance from S8 to the point of interest. Finally, although not described in detail in this disclosure, it may be possible to also determine the machine ground speed term based on the signals from sensor S8. In particular, a combination of wheel speeds, an acceleration value, and "corner speeds", which will be described in more detail below, may be utilized to calculate a machine speed estimate.

The machine 50 may also use existing or additional sensors to derive a direction signal indicating the direction of travel of the machine 50. In the illustrated embodiment of FIG. 3, for example, an optional gear sensor S9 may be provided for sending whether the transmission is in reverse or a forward gear, from which it may be inferred that the machine is traveling in reverse or forward. The control unit may use direction of travel information to properly apply the yaw rate signal from sensor S8 to modify corner speed estimates, as better understood below. Information regarding travel direction, however, may be derived from one of the other sensors, such as wheel speed sensors that also sense direction of rotation. Direction of travel may also be derived from wheel speed and yaw rate information. In some embodiments of the central control unit 10, the actual direction of machine travel may not be required to obtain corner speed estimates, and therefore a direction sensor is merely optional.

An acceleration sensor S7 may also be provided for detecting acceleration of the machine, however this sensor is also optional. Whether the machine is accelerating or decelerating determines whether upper or lower corner speed estimates are used, as understood more fully below. The acceleration or deceleration of the machine, however, may be determined by a throttle sensor that provides a throttle position signal, a brake sensor that provides a brake pedal signal, or a combination of the two. Additionally, the acceleration sensor S7 may be omitted, as it is possible to generate adequate corner speed estimates using only the yaw rate and the wheel speeds. The acceleration sensor S7, however, may be advantageous when determining the grade of the surface over which the machine is traveling, as noted more fully below.

Figure 4:
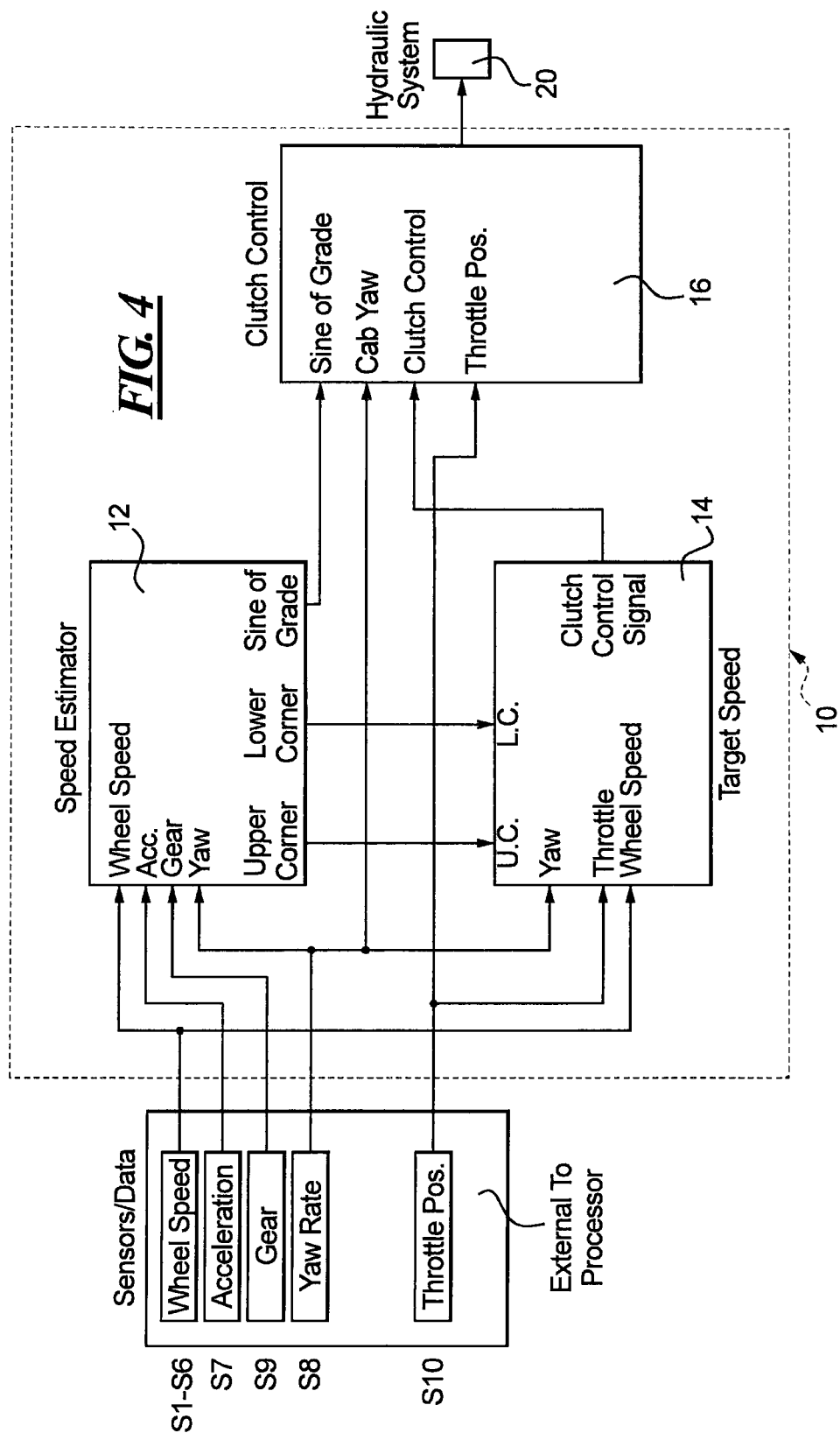
FIG. 4 is an enlarged schematic of a central control unit used in the traction optimization system.

Referring now to FIG. 4, a block diagram of an exemplary control unit 10 is provided. The control unit 10 relies on various vehicle data supplied by a series of sensors S1-S10. As previously discussed with reference to FIG. 3, the sensors include six wheel speed sensors S1-S6 adapted to generate wheel speed signals responsive to observed wheel speeds and yaw rate sensor S8 adapted to generate a yaw rate signal having a value responsive to an orientation rate of change of the machine.

The control unit 10 may include multiple modules, such as a speed estimator module 12, a target speed module 14 and a clutch control module 16 (FIG. 4). The speed estimator module 12 estimates true speed over ground for each wheel and outputs upper and lower corner speed estimates based on measured characteristics of the truck. The target speed module 14 generates ideal, practical and actual targets for minimizing wheel spin and slip based on the estimations provided by the speed estimator module 12. The clutch control module 16 generates differential clutch control signals based on the actual targets provided by the target speed module 14 and outputs the differential clutch control signals to each differential clutch hydraulic valve 92F, 92C, 92R, 92I. Together, these three modules 12, 14 and 16 serve to minimize wheel spin and slip of an articulated truck, and to optimize control of a hydraulic system 20 that operates the inter-axle and cross-axle differential clutches.

Figure 5:
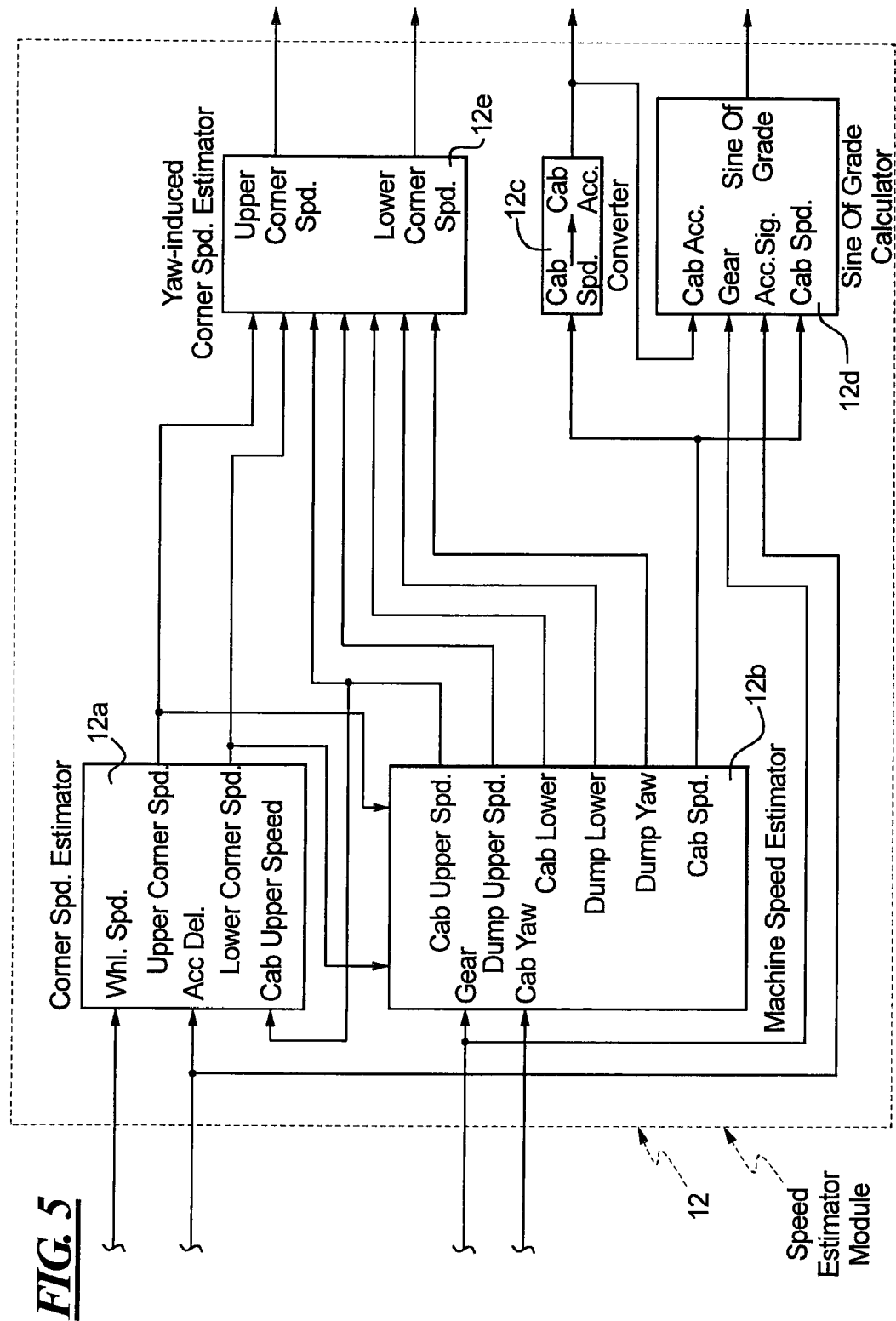
FIG. 5 is an enlarged schematic of a speed estimator module used in the central control unit of FIG. 4.

Referring now to FIG. 5, an exemplary speed estimator module 12 is provided in more detail. The speed estimator module 12 includes a corner speed estimator 12a, a machine speed estimator 12b, a converter 12c, a sine of grade calculator 12d and a yaw-induced corner speed estimator 12e.

As used herein, the term "corner speed" is used to identify the true speed over the ground of an axle end for a particular wheel. Preliminary corner speed estimates are calculated at the corner speed estimator 12a based on observed data and corner speed estimate signals are generated. More specifically, observed wheel speed, machine acceleration and the estimated upper speed estimate of the cab 52 are input into the corner speed estimator 12a to calculate acceleration and deceleration estimates. From the acceleration and deceleration estimates, the corner speed estimator 12a calculates upper and lower corner speed estimates, respectively. The corner speed estimator 12a also provides feedback loops to monitor previous upper and lower corner speed estimates and to make any adjustments accordingly. The updated upper and lower corner speed estimates are then transmitted to the machine speed estimator 12b and the yaw-induced corner speed estimator 12e for further processing.

The machine speed estimator 12b serves to estimate corner speed estimates for each of the cab 52 and dump body 54 based on the observed data. In particular, the machine speed estimator 12b observes gear data, the yaw rate of the cab, and the corner speed estimates provided by the corner speed estimator 12a to output various signals to the yaw-induced corner speed estimate estimator 12e. These signals include upper and lower corner speed estimate signals for the cab 52, upper and lower corner speed estimate signals for the dump body 54, and the estimated yaw rate signal for the dump body 54.

The machine speed estimator 12b additionally estimates the overall cab speed by taking the average of the upper and lower corner speed estimates of the cab. The estimated cab speed is then transmitted to the converter 12c, which converts the cab speed into cab acceleration information. Both cab speed and cab acceleration information is transmitted to the sine of grade calculator 12d. The sine of grade calculator 12d uses the cab speed and acceleration information in conjunction with observed gear and acceleration data to establish thresholds for use with the clutch control module 16, as will be discussed more specifically below.

The yaw-induced corner speed estimator 12e considers the information provided by the corner speed estimator 12a and the machine speed estimator 12b, and determines more filtered and finalized upper and lower corner speed estimate signals. Specifically, the yaw-induced corner speed estimator 12e determines speed differentials induced by cab 52 and dump body 54 yaw rates. The yaw-induced speed differentials are then used to compare and, if necessary, modify each of the corner speed estimates provided by the corner speed estimator 12a. For instance, the upper corner speed estimate of each front cab wheel (i.e., the front left wheel 58L and front right wheel 58R), is compared to the yaw-induced speed differential calculations. Any necessary adjustments are made to the upper corner speed estimates for the front cab wheels according to the observed cab yaw rate and the state of the gear, for example, forward or reverse. Similar considerations are made to the upper and lower corner speed estimates of the dump body wheels, or center left wheel 60L, the center right wheel 60R, the rear left wheel 62L, and rear right wheel 62R. The resulting upper and lower corner speed estimate signals of the six wheels are then transmitted to the target speed module 14 for further processing.

Using the corner speed estimate signals provided by the speed estimator module 12, the target speed module 14 is able to generate two sets of target speed signals. The first set of target speed signals is directed toward preventing unnecessary wheel spin (i.e., traction control), and the second set of target speed signals is directed toward preventing unnecessary wheel slip (i.e., anti-lock braking). As shown in the exemplary schematic of FIG. 6, the top half is responsible for generating anti-spin targets while the bottom half is related to generating anti-slip targets.

Figure 6:
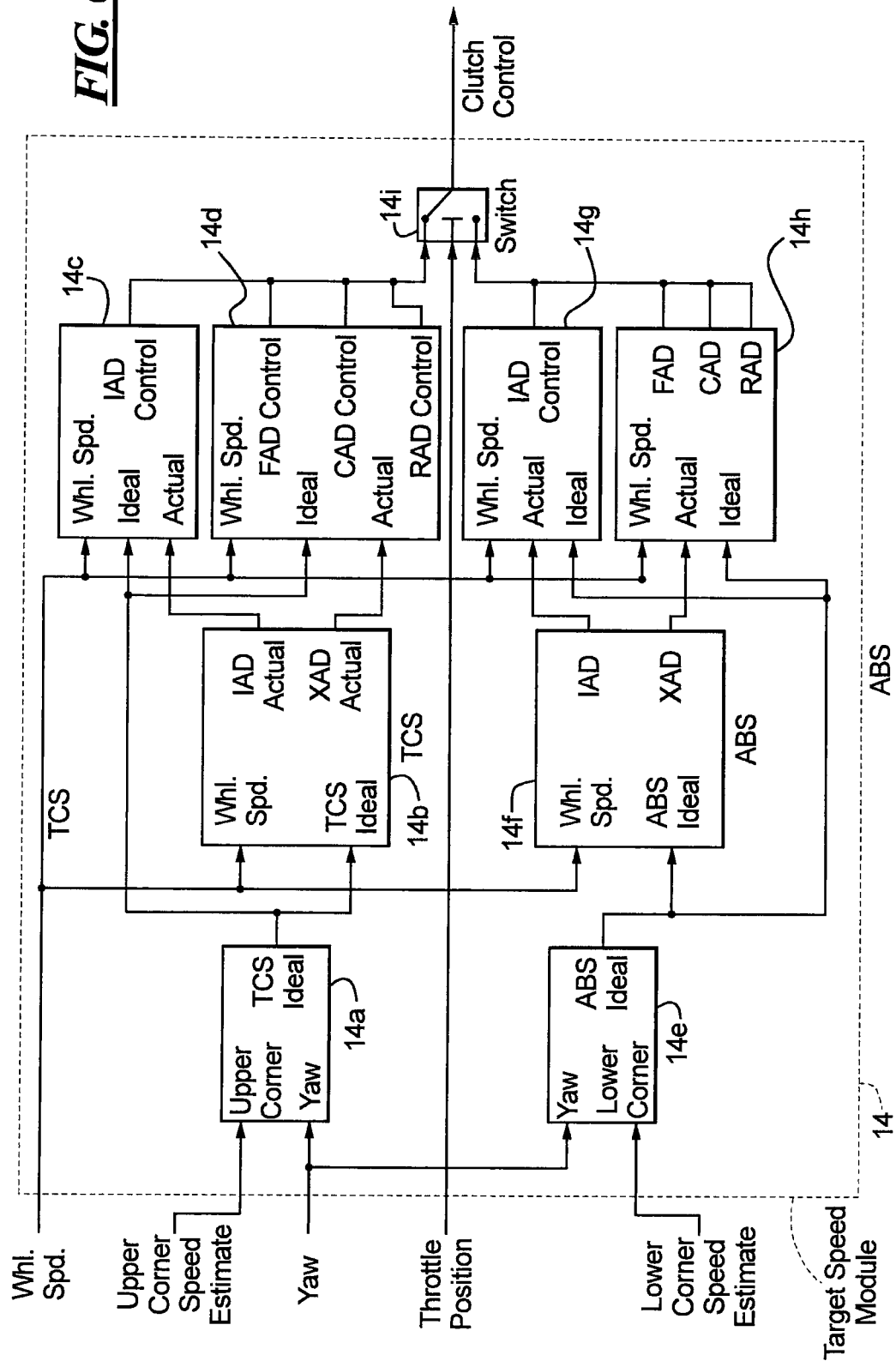
FIG. 6 is an enlarged schematic of a target speed module used in the central control unit of FIG. 4.

With respect to the anti-spin targets, and referring specifically to the top half of FIG. 6, the target speed module 14 provides an ideal target generator 14a, an actual target generator 14b, and control signal generators 14c, 14d. The ideal target generator 14a calculates an ideal target signal based on the upper corner speed estimate signals and the observed cab yaw rate signal. More specifically, ideal vehicle characteristics are applied to the estimated yaw-induced upper corner speed estimate signals of each wheel and output to the actual target generator 14b as ideal target signals. The ideal target speed signal may represent a wheel speed that results in maximum tractive efficiency for the current ground speed and actual ground conditions.

To optimize traction control, the target speed module 14 generates at least one practical target speed signal for each wheel, compares the practical target speed signal(s) to the ideal target speed signal, and selects the maximum of the practical and ideal target speed signals as the actual target sped signal. The practical target speed signals relate to the instantaneous wheel speeds coupled with the physical arrangements on the machine. For example, the clutch cannot limit wheel spin on the inner side wheel before it reaches the speed of outer side wheel during a turn. Another practical target speed signal may be generated if the engine speed is close to the maximum governed speed for a particular gear. Still other practical speed targets may be based on the configuration of the clutch actuators. These and other practical considerations may be used to formulate one or more practical target speed signals for each wheel.

Figure 7:
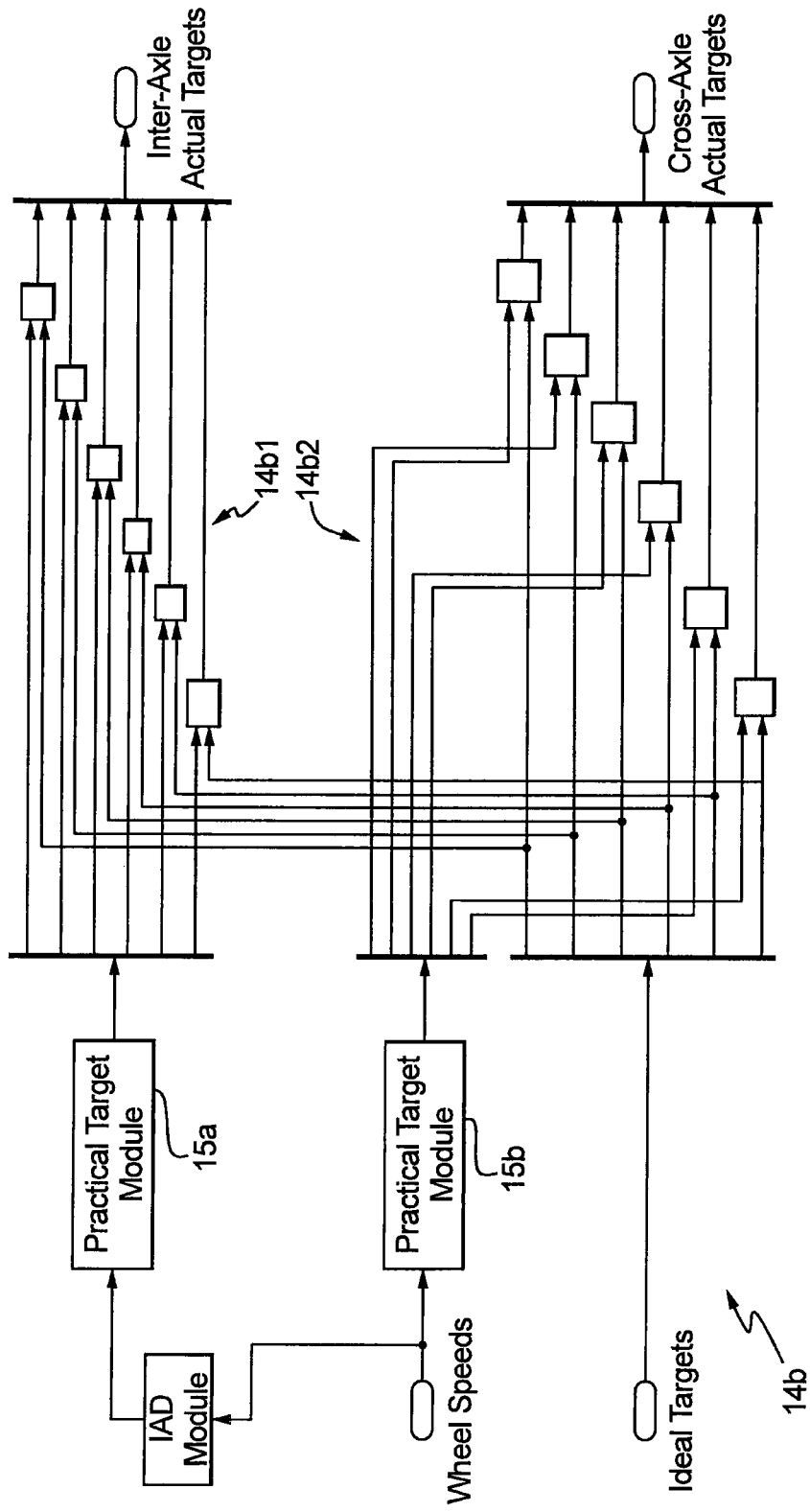
FIG. 7 is an enlarged schematic of a traction control system used in the target speed module of FIG. 6.

As shown in FIG. 7, the actual target generator 14b includes inter-axle and cross-axle practical target modules 15a, 15b for converting the observed wheel speed signals into inter-axle and cross-axle practical target speed signals. In particular, to obtain the inter-axle practical target speed signals, the observed wheel speed signals are applied to an expression characteristic of the vehicle's inter-axle dynamics, and subsequently modified with offsets, gains and practical constraints. Cross-axle practical target speed signals are determined by applying offsets, gains and practical constraints directly onto the observed wheel speeds. Each of the resulting inter-axle practical target speed signals is compared to its corresponding ideal target speed signal as shown by the first array of signals 14b1. The resulting maximum target values are designated and output as inter-axle actual target speed signals. Similarly, each of the resulting cross-axle practical target speed signals is compared to its corresponding ideal target speed signal as shown by the second array of signals 14b2. The resulting maximum target values are designated and output as cross-axle actual target speed signals.

Turning back to FIG. 6, observed wheel speed signals, ideal target speed signals, and actual target speed signals are transmitted to each of the control signal generators 14c, 14d. The inter-axle control signal generator 14c analyzes errors between the observed wheel speed signals, the ideal target speed signals, and the actual target speed signals, and generates an inter-axle control signal for correcting the errors. Similarly, the cross-axle control signal generator 14d analyzes errors between the observed wheel speed signals, the ideal target speed signals, and actual target speed signals for each axle, and generates a cross-axle control signal for correcting the errors associated with each axle.

With respect to the anti-slip targets, and with reference to the bottom half of FIG. 6, the target speed module 14 provides an ideal target generator 14e, an actual target generator 14f, and control signal generators 14g, 14h. The ideal target generator 14e calculates an ideal target speed signal based on the lower corner speed estimate signal and observed cab yaw rate signal. More specifically, ideal vehicle characteristics are applied to the estimated yaw-induced lower corner speed estimate signals of each wheel and output to the actual target generator 14f as ideal target speed signals.

Figure 8:
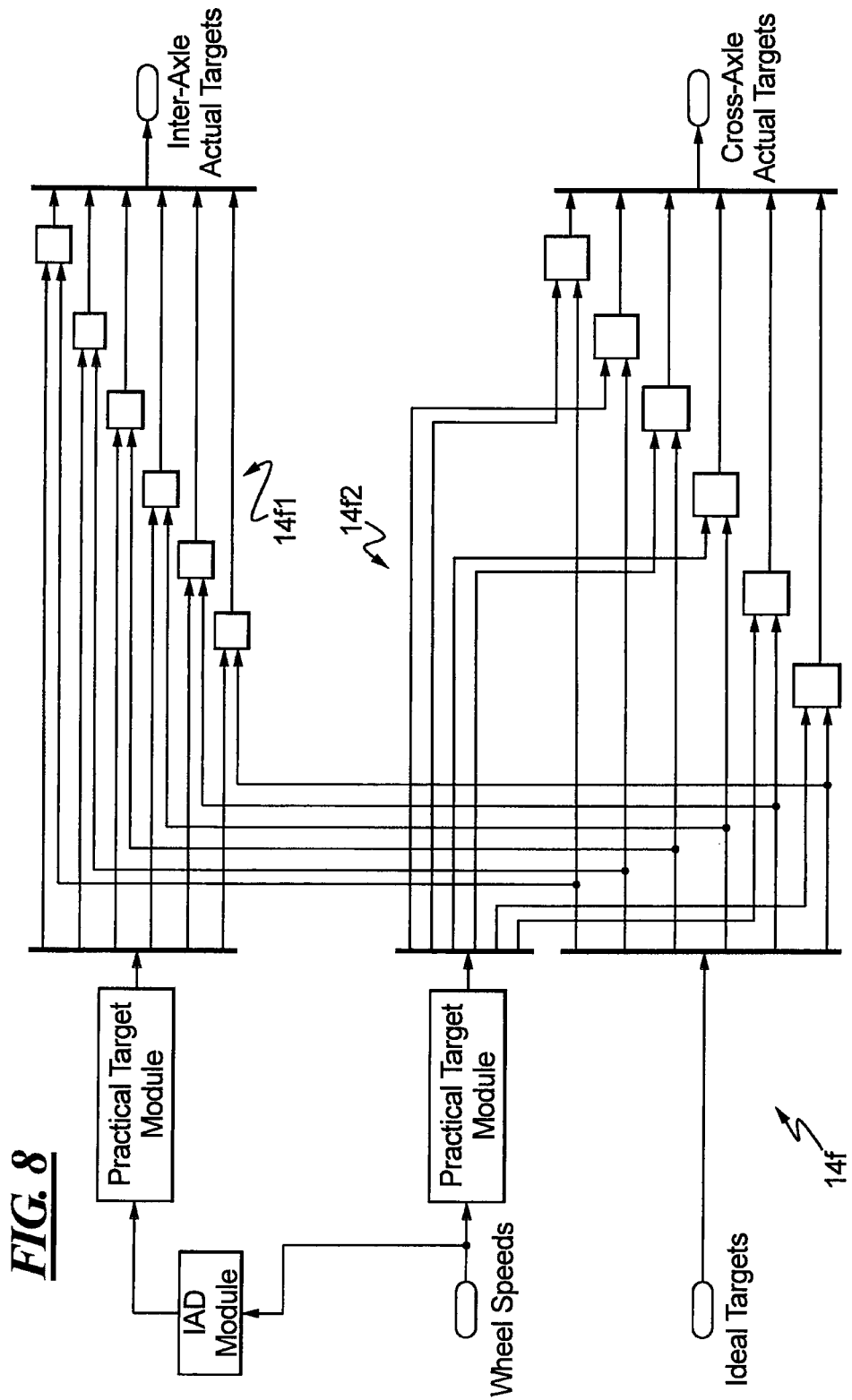
FIG. 8 is an enlarged schematic of an anti-lock brake system used in the target speed module of FIG. 6.

To optimize anti-lock braking, the target speed module 14 generates a practical target speed signal, compares the practical target speed signal to the ideal target speed signal, and selects the minimum of the practical and ideal target speed signals as an actual target speed signal for the controller. As shown in FIG. 8, the actual target generator 14f converts the observed wheel speed signal into inter-axle and cross-axle practical target speed signals. In particular, to obtain the inter-axle practical target speed signals, the observed wheel speed signals are applied to an expression characteristic of the vehicle's inter-axle dynamics, and subsequently modified with offsets, gains and practical constraints. Cross-axle practical target speed signals are determined by applying offsets, gains and practical constraints directly onto the observed wheel speed signals. Each of the resulting inter-axle practical target speed signals is compared to its corresponding ideal target speed signal as shown by the first array of signals 14f1. The resulting minimum target values are designated and output as inter-axle actual target speed signals. Similarly, each of the resulting cross-axle practical target speed signals is compared to its corresponding ideal target speed signal as shown by the second array of signals 14f2. The resulting minimum target values are designated and output as cross-axle actual target speed signals.

In the foregoing description, the actual target speed signals are derived by selecting the maximum (for traction control) or minimum (for anti-lock braking) of the ideal and practical target speeds. The actual target speed signals, however, may be derived using other processes. For example, the actual target speed signal may be derived by using a combination or "blend" of the ideal and practical target speed signals. An algorithm, ratio, or other function may be used to combine the ideal and practical target speed signals. In certain situations, the function used to obtain the blended actual target signal may still output a maximum or minimum of the ideal and practical target speed signals, but otherwise may output a signal derived from both signals.

Turning back to FIG. 6, observed wheel speed signals, ideal target speed signals, and actual target speed signals are transmitted to each of the control signal generators 14g, 14h. The inter-axle control signal generator 14g analyzes errors between the observed wheel speed signals, the ideal target speed signals, and the actual target speed signals, and generates an inter-axle control signal for correcting the errors. Similarly, the cross-axle control signal generator 14h analyzes errors between the observed wheel speed signals, the ideal target speed signals, and the actual target speed signals for each axle, and generates a cross-axle control signal for correcting the errors associated with each axle.

Once anti-spin and anti-slip control signals based on actual target speed signals have been generated, the switch 14i of FIG. 6 determines which control to output based on the observed throttle position. For instance, if the observed throttle position is open, which indicates an operator's intent to accelerate, the switch 14i may output anti-spin control signals to maximize traction. Alternatively, if the observed throttle position is closed, which may indicate an operator's intent to coast, decelerate or stop, the switch 14i may output anti-slip control signals to minimize slip. In any event, the resulting control signals are then transmitted to the clutch control module 16 of FIG. 4 for further processing.

Figure 9:
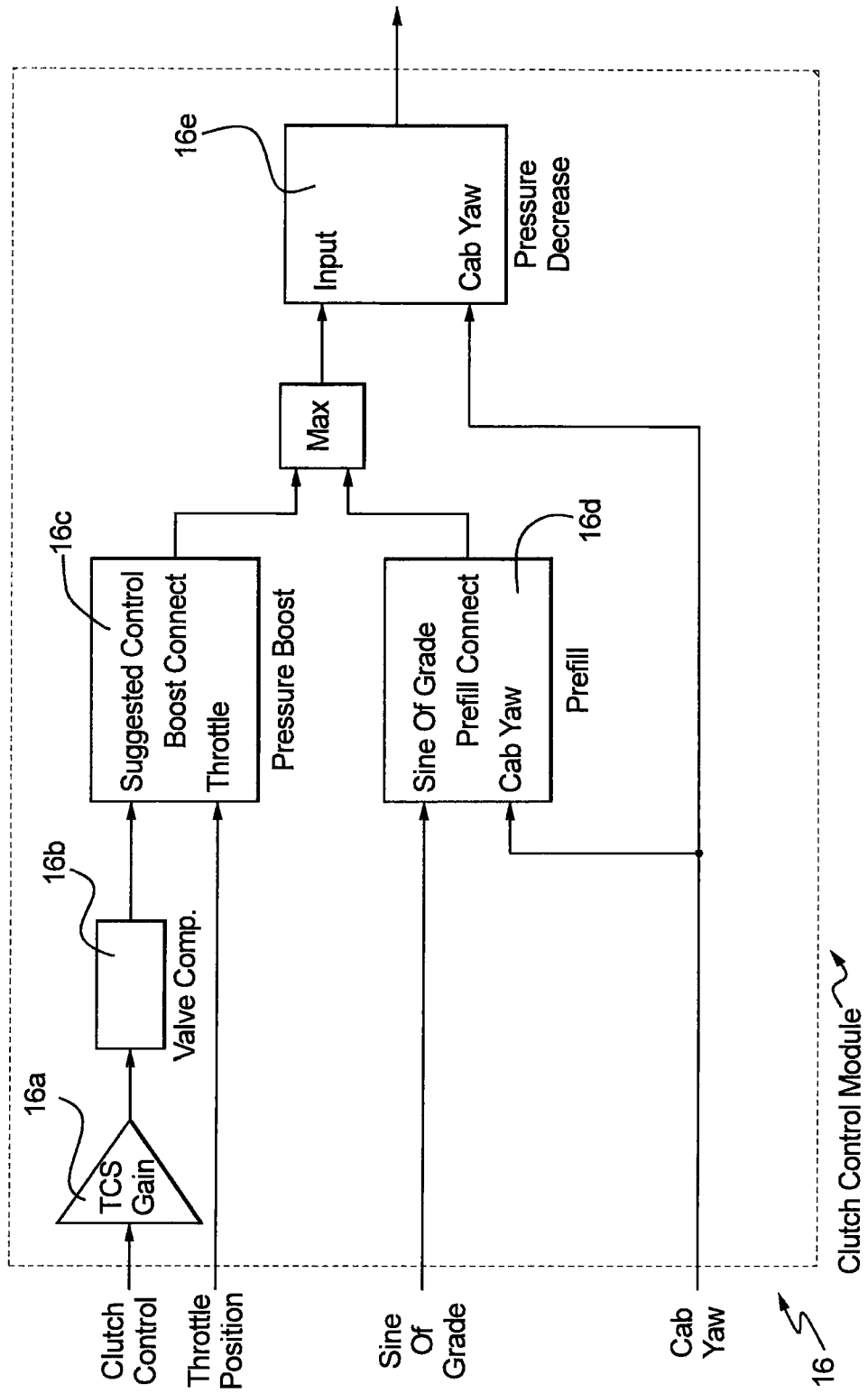
FIG. 9 is an enlarged schematic of a clutch control module used in the central control unit of FIG. 4.

The clutch control module 16 serves to convert the control signals provided by the target speed module 14 into physical actuation of corresponding differential clutches 90F, 90C, 90R, 90I. Referring now to FIG. 9, the clutch control module 16 may provide the control unit 10 with a system gain 16a and a valve compensator 16b. The system gain 16a serves to increase the overall gain of the control signal so as to be comparable to ranges of clutch pressure. The valve compensator 16b serves to interpolate the signal data, filter the interpolation and compensate for dynamic nonlinearities associated with hydraulic systems such as hysteresis and backlash. The process signal may then be transmitted to a pressure decrease filter 16e, which observes cab yaw rate, observes the new input current, and monitors feedback of a previous control current in view of the input current. Depending on these factors, if necessary, the new input current is adjusted and the pressure decrease filter 16e outputs a new clutch control signal to the hydraulic valves to operate the differential clutches in a manner that optimizes wheel traction.

The clutch control module 16 may optionally include a pressure booster 16c and a prefiller 16d to improve controller performance and resulting improved steering in certain situations. The pressure booster 16c may be used to provide an initial, temporary increase in the differential clutch control signal to reduce power dissipation in the clutch. The pressure booster 16c compares the process signal to feedback from a previously applied clutch control signal. Based on this comparison and the observed throttle position, the current, or pressure to be applied, is boosted accordingly. The pressure boost is temporary, in that it is immediately reduced in a controlled manner. The pressure boost will cause the wheels speeds to equalize. The magnitude of the pressure boost may be limited to a fractional increase to improve the ability of the clutch to slip should the machine move to a higher friction surface, thereby increasing the ability to steer the machine.

The prefiller 16d may be used to improve performance over steep inclines. As shown in FIG. 9, the prefiller 16d observes the cab yaw rate and the sine of grade provided by the calculator 12d discussed above with respect to FIG. 5. The prefiller may apply a prefill current when the observed sine of grade is beyond a set threshold indicating a significant incline. Conversely, if there is no detected incline and the sine of grade is below a predetermined threshold, no prefill current is supplied.

As shown in FIG. 9, the boost and prefill current values provided by the pressure booster 16c and prefiller 16d may be compared, and only the greater of the two current values is transmitted as input current to the pressure decrease filter 16e.

As outlined above, once the actual wheel speeds align with the target wheel speeds, control may be satisfied and the actual wheel speeds may remain in close proximity to the target wheel speeds. Although beneficial from the perspective of machine performance, issues may arise with respect to clutch power dissipation. In particular, differential clutches can tolerate slip and high power dissipation without issue, but only for brief uninterrupted periods. When slip and high power dissipation occur for extended periods of time, however, a temperature of friction material within the clutches could near or even exceed material limits and a reduced lifetime or perhaps complete clutch destruction could result.

Consequently, it may be necessary to have an additional control strategy that proactively addresses the concern of slip and high power dissipation for extended periods of time. This control strategy may employ the pressure booster 16c described above. Specifically, once the above-described algorithms are satisfied from a closed-loop perspective (i.e., once the actual wheel speed is within close proximity to the target wheel speeds), then an additional boost of the order of 5% to 30% may be applied to the pressure of differential clutch 160. This pressure boost may cause the speeds on both sides of the differential clutch 160 to synchronize, thereby reducing clutch power dissipation essentially to zero. Additionally, since the pressure applied to differential clutch 160 may be boosted by only about 5% to 30%, steering may not be unnecessarily compromised, even if steering is required and underfoot conditions have improved.

Figure 11:
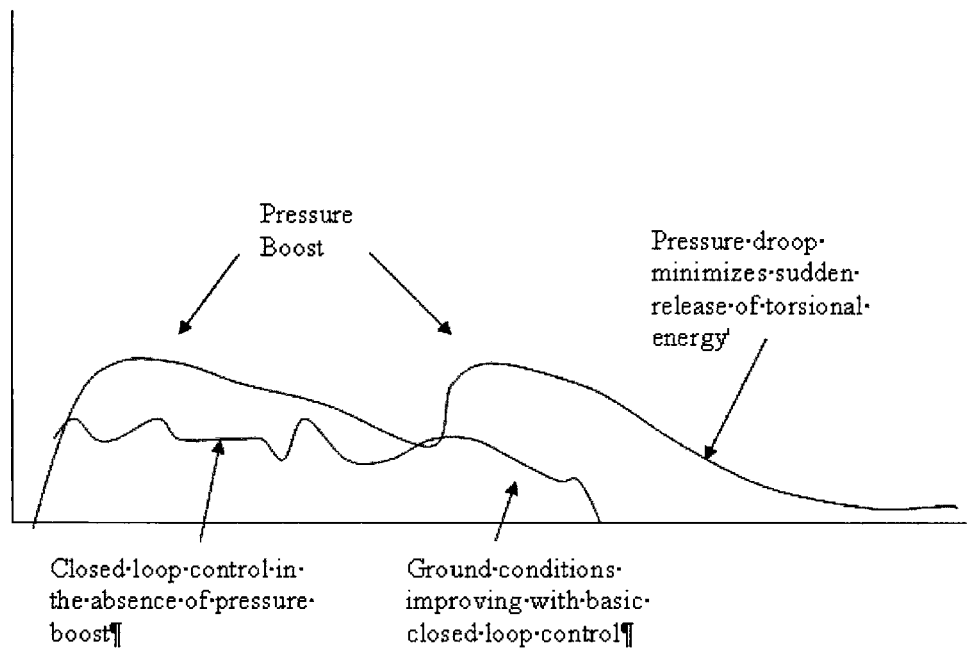
FIG. 11 is a graph illustrating an exemplary disclosed operation of the traction optimization system of FIG. 1.

The disclosed control strategy may include yet an additional feature. Specifically, when underfoot conditions have improved and application of differential clutch 160 is no longer required, the pressure of fluid within differential clutch 160 may be gradually reduced. That is, in contrast to a step reduction of pressure that could result in machine shaking, the pressure within the clutch could be allowed to reduce for a determined period of time such that the sudden release of stored torsional energy in the drivetrain and wheels of the machine may likewise be reduced. This strategy may be illustrated in FIG. 11.

It has been observed that particular machines, for example articulated trucks, tend to bounce away from a ground surface in some situations. These situations may correspond with, for example, operation in sandy underfootings, particularly when running unloaded. In these situations, the ground speeds of center and rear wheels 60, 62 oscillate above and below an average value. The front wheels 58 tend to do the same thing, however about a different average and/or out of phase (as much as 180° out of phase) with the center and rear wheels 60, 62. In a specific example, the wheel speed oscillation is a roughly 3 Hz phenomenon when unloaded and an approximately 2 Hz phenomenon when loaded. The machine, particularly the dump body 54, as a result of the wheel oscillation, bounces vertically at the same rate. The oscillating speeds and machine bouncing can be explained as follows: when dump body 54 lifts, weight comes off the center and rear wheels 60, 62, thereby causing them to speed up. With less reaction from the center and rear wheels 60, 62 at the center differential 76, less torque may be applied to the front wheels 58, thereby causing the front wheels 58 to slow down. Then, as the dump body 54 comes back down, the opposite happens, and so on.

Figure 12:
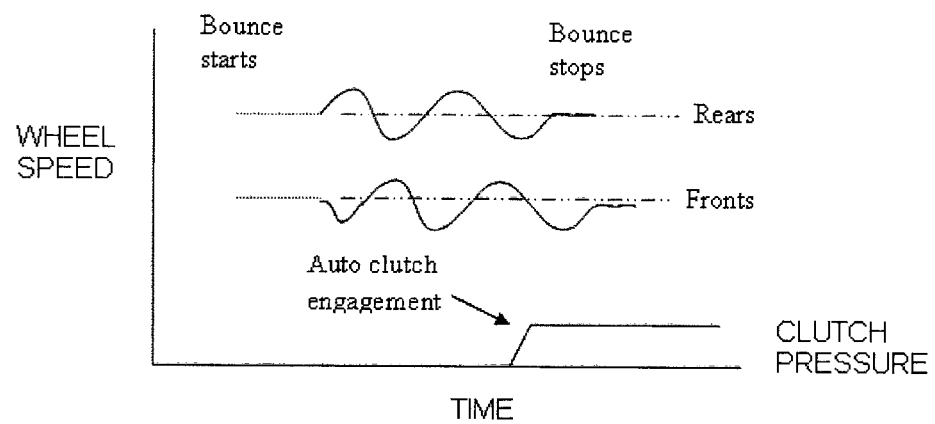
FIG. 12 is another graph illustrating another exemplary disclosed operation of the traction optimization system of FIG. 1.

Machine bouncing may be reduced by breaking this chain of lift/speed-up/lower/slow-down through the use of the differential clutch 160. In particular, based on a detected out-of-phase oscillation of the front and center or rear wheel speeds around their respective averages, differential clutch 160 may be applied during a high-speed point in the oscillation. In this way the bounce can be stopped very shortly after it starts and before it becomes an irritant for the operator. Alternatively, differential clutch 160 may be applied based on detection of a significant deviation of the speed of the center or rear wheels 60, 62 averaged over time, above the speed of the front wheels 58 averaged over time. The average overspeed of the center or rear wheels 60, 62, may often be a precursor to bounce in the unloaded condition and, if used to initiate clutch activation, may be capable of stopping bounce before it is ever manifest. In yet a final embodiment, both control strategies may be utilized together, if desired. This strategy may be illustrated in FIG. 12.

In addition to facilitating traction control (i.e., in addition to adding in wheel slip and spin prevention), yaw rate sensor S8 may also be used for other purposes. In particular, yaw rate sensor S8 may be used to improve the interaction between steering and mobility. Typically, mobility may be enhanced on steep grades by application of differential clutches. However, if the machine 50 is actively being articulated while traversing a steep grade, use of the clutches can interfere with the articulation. This may be particularly true in the case of the differential clutch 160 on the front differential 72. Specifically, if the machine is already articulated to some degree, and the operator to straighten the cab (counter steer), the machine may have a tendency to stay articulated when under power in a forward direction. Utilizing the yaw rate sensor S8, however, may allow mitigation of the mobility/steering compromise in two ways.

First, if there is active yaw rate in excess of what would be expected due to the curvilinear motion of the machine, then the application of differential clutch 160 can be modified to favor steering. That is, the signal from the yaw rate sensor S8 can be integrated with respect to time to estimate a current articulation angle. As with most rate sensors, this integration must be handled carefully in order for the integration to be meaningful. That is, the integration may drift over extended periods of time and a near-zero yaw rate signal that endures for some time when the machine is in forward motion should simply indicate a near-zero articulation angle. The most aggressive application of differential clutch 160 can be reserved for this condition. Note that this logic may not apply for an articulated truck traveling in the reverse direction, as it may be possible to develop a significant articulation angle when in reverse. Depending on how the operator steers the machine, the dump body 54 may begin to articulate without a noticeable yaw rate on the cab portion 52.

After a near-zero articulation condition is established in the forward direction, integration of the yaw rate signal may allow the articulation angle to be tracked on a short term basis. If the yaw rate continues to be significant for an extended period of time, the integration algorithm may no longer provide precise estimation of articulation, but simply indicate that the machine may now be significantly articulated. In this situation, the control portion of the algorithm may move to the least aggressive application of differential clutch 160.

INDUSTRIAL APPLICABILITY

The disclosed machine control system may be well-suited for improving steering, mobility, and con traction control. Exemplary machines that may benefit from the controller, include motor graders, wheel harvesters, rotary mixers, wheel skidders, four-wheel drive vehicles, quarry construction trucks, large mining trucks, wheel loaders, wheel tractor scrapers, and articulated trucks.

The disclosed machine control system improves steering by continuously estimating the true speed of each wheel over the ground as a reference from which various corner speed targets are generated. In particular, the controller generates ideal wheel speed targets and practical wheel speed targets based on the machine's detected wheel speed and yaw rate. The controller then selectively determines actual wheel speed targets based on the ideal and practical target values, and outputs the appropriate controls to the corresponding differential clutches. The cross-axle actual speed targets more improve traction side-to-side differences in traction, such as where one or more wheels on one side of the machine contact a low friction surface while the wheels on the other side of the machine contact a higher friction surface. In these conditions, the cross-axle actual speed targets identify either maximum wheel speeds during acceleration (to minimize spin) or minimum wheel speeds during deceleration (to minimize slip). The inter-axle actual speed targets improve traction in front-to-rear differences in traction, such as when the machine is moving uphill and the carried load shifts from the front of the machine to the back, thereby increasing the tendency of the front wheels to spin. In such conditions, the inter-axle actual speed targets identify either maximum wheel speeds during acceleration (to minimize spin) or minimum wheel speeds during deceleration (to minimize slip). The differential clutch controller is more robust and maximizes traction for all environments and operating speeds, while minimizing the negative impacts on steering of the machine in low traction environments. Steering of machines using the controller disclosed herein is significantly improved over conventional manually operated differential clutches.

It will be apparent to those skilled in the art that various modifications and variations can be made to the machine control system of the present disclosure. Other embodiments will be apparent to those skilled in the art from consideration of the specification and practice of the machine control system disclosed herein. It is intended that the specification and examples be considered as exemplary only, with a true scope being indicated by the following claims and their equivalents.

What is claimed is:

1. A method of operating an articulating machine having a front portion, a rear portion attached to the front portion via an articulation joint, and a plurality of traction devices operatively coupled to the front portion and the rear portion via respective axle assemblies, comprising:
sensing a rotational speed of at least one of the plurality of traction devices with a speed sensor;
determining a ground speed of the machine relative to the operating surface as a function of the sensed rotational speed;
determining a ground speed signal associated with a first traction device as a function of the ground speed of the machine, the ground speed signal indicative of a ground speed of the first traction device relative to the operating surface;
determining an ideal rotational target speed value for the first traction device as a function of the ground speed associated with the first traction device, the ideal rotational target speed providing a maximum tractive efficiency for the ground speed;
determining a practical rotational target speed value associated with the first traction device as a function of the sensed rotational speed of the first traction device;
determining an actual rotational target speed value based on a combination of the ideal rotational target speed value and the practical rotational target speed value;
determining an articulation angle between the front portion and the rear portion of the machine;
determining an engagement force based on the ideal rotational target speed value and the determined articulation angle, wherein the magnitude of the engagement force decreases as the magnitude of the articulation angle of the machine increases;
selectively reducing the rotational speed of the first traction device if the sensed rotational speed of the first traction device is greater than the actual rotational target speed value for the first traction device by selectively engaging a hydraulically actuated clutch assembly by selectively supplying fluid at a first fluid pressure based on the determined engagement force, wherein the hydraulically actuated clutch assembly is associated with a differential gear set disposed within the axle assembly for the first traction device; and
selectively increasing the pressure of the fluid supplied to the hydraulically actuated clutch assembly to a second pressure greater than the first pressure after the clutch is initially engaged.

2. The method of claim 1, wherein the second pressure is 5% to 30% greater than the first pressure.

3. The method of claim 1, further including selectively disengaging the hydraulically actuated clutch assembly by gradually decreasing the pressure of the supplied fluid.

4. The method of claim 1, wherein the differential gear set interconnects a first axle associated with the first traction device with a second axle associated with a second traction device.

5. The method of claim 4, wherein:
the differential gear set includes a ring gear fixed to a differential gear housing and operatively connected to an output shaft of a transmission; and
the hydraulically actuated clutch is interconnected between the ring gear and one of the first or second axles.

6. The method of claim 1, further including:
selectively reducing the rotational speed of the first traction device to be about equal to the actual rotational target speed value.

7. The method of claim 1, wherein the speed sensor is configured to measure a rotational speed of a first axle operatively connected to the first traction device.

8. The method of claim 1, wherein the plurality of traction devices are a plurality of wheels.

9. The method of claim 1, further including:
sensing a rotational speed of at least two of the plurality of traction devices with at least two speed sensors; and
determining the ground speed of the machine relative to the operating surface based at least in part on the at least two sensed speeds.

10. The method of claim 9, further including determining the ground speed of the machine relative to the operating surface by averaging the two sensed speeds and converting the averaged rotational speed to speed signal indicative of a ground speed of the machine.

11. The method of claim 1, further comprising:
sensing a rate of change of an orientation of the machine relative to an operating surface with an inertial yaw-rate sensor, wherein the inertial yaw-rate sensor is associated with at least one of the front portion and the rear portion;
determining the articulation angle based at least in part on the sensed rate of change of the orientation of the machine; and
determining the ground speed signal associated with the first traction device as a function of the ground speed of the machine and the sensed rate of change of orientation of the machine.

12. A method of operating an articulating machine having a front portion, a rear portion attached to the front portion via an articulation joint, and a plurality of traction devices operatively coupled to the front portion and the rear portion via respective axle assemblies, comprising:
sensing a rotational speed of at least one of the plurality of traction devices with a speed sensor;
sensing a rate of change of an orientation of the machine relative to an operating surface with an inertial yaw-rate sensor, wherein the inertial yaw-rate sensor is associated with at least one of the front portion and the rear portion;
determining a ground speed of the machine relative to the operating surface as a function of the sensed rotational speed;
determining a ground speed signal associated with a first traction device as a function of the ground speed of the machine, the ground speed signal indicative of a ground speed of the first traction device relative to the operating surface;
determining an ideal rotational target speed value for the first traction device as a function of the ground speed signal associated with the first traction device, the ideal rotational target speed providing a maximum tractive efficiency for the ground speed;

determining a practical rotational target speed value associated with the first traction device as a function of the sensed rotational speed of the first traction device;

determining an actual rotational target speed value based on a combination of the ideal rotational target speed value and the practical rotational target speed value;

determining an articulation angle between the front portion and the rear portion of the machine;

determining an engagement force based on the ideal rotational target speed value and the determined articulation angle, wherein the magnitude of the engagement force decreases as the magnitude of the articulation angle of the machine increases;

selectively reducing the rotational speed of the first traction device if the sensed rotational speed of the first traction device is greater than the actual rotational target speed value for the first traction device by selectively engaging a hydraulically actuated clutch assembly by selectively supplying fluid at a first fluid pressure based on the determined engagement force, wherein the hydraulically actuated clutch assembly is associated with a differential gear set disposed within the axle assembly for the first traction device; and selectively increasing the pressure of the fluid supplied to the hydraulically actuated clutch assembly to a second pressure greater than the first pressure after the clutch is initially engaged.

13. The method of claim 12, wherein the second pressure is 5% to 30% greater than the first pressure.

14. The method of claim 12, further including selectively disengaging the hydraulically actuated clutch assembly by gradually decreasing the pressure of the supplied fluid.

15. The method of claim 12, further including:
selectively reducing the rotational speed of the first traction device to be about equal to the actual rotational target speed value.

16. The method of claim 12, wherein the speed sensor is configured to measure a rotational speed of a first axle operatively connected to the first traction device.

17. The method of claim 12, further including:
sensing a rotational speed of at least two of the plurality of traction devices with at least two speed sensors; and
determining the ground speed of the machine relative to the operating surface based at least in part on the at least two sensed speeds.

18. The method of claim 12, further including determining the ground speed of the machine relative to the operating surface by averaging the two sensed speeds and converting the averaged rotational speed to a speed signal indicative of a ground speed of the machine.

19. A method of operating an articulating machine having a front portion, a rear portion attached to the front portion via an articulation joint, and a plurality of traction devices operatively coupled to the front portion and the rear portion via respective axle assemblies, comprising:
sensing a rotational speed of at least one of the plurality of traction devices with a speed sensor;
sensing a rate of change of an orientation of the machine relative to an operating surface with an inertial yaw-rate sensor, wherein the inertial yaw-rate sensor is associated with at least one of the front portion and the rear portion;
determining a ground speed of the machine relative to the operating surface as a function of the sensed rotational speed;
determining a ground speed signal associated with a first traction device as a function of the ground speed of the machine, the ground speed signal indicative of a ground speed of the first traction device relative to the operating surface;
determining a first rotational target speed value for the first traction device as a function of the ground speed associated with the first traction device;
comparing the sensed rotational speed of the first traction device with a respective rotational target speed value associated with the first traction device;
determining an articulation angle between the front portion and the rear portion of the machine;
determining an engagement force based on the ideal rotational target speed value and the determined articulation angle, wherein the magnitude of the engagement force decreases as the magnitude of the articulation angle of the machine increases;
selectively reducing the rotational speed of the first traction device if the sensed rotational speed of the first traction device is greater than the first rotational target speed value for the first traction device by selectively engaging a hydraulically actuated clutch assembly by selectively supplying fluid at a first fluid pressure based on the determined engagement force, wherein the hydraulically actuated clutch assembly is associated with a differential gear set disposed within the axle assembly for the first traction device;
selectively increasing the pressure of the fluid supplied to the hydraulically actuated clutch assembly to a second pressure greater than the first pressure after the clutch is initially engaged, wherein the second pressure is 5% to 30% greater than the first pressure; and
selectively disengaging the hydraulically actuated clutch assembly by continuously decreasing the pressure of the supplied fluid.

20. The method of claim 19, wherein the first rotational target speed value is an ideal rotational target speed value, and the method further includes:
determining a practical rotational target speed value associated with the first traction device as a function of a sensed rotational speed of the second traction device;
determining an actual rotational target speed value as a maximum of the ideal rotational target speed value and the practical rotational target speed value; and
selectively reducing the rotational speed of the first traction device to be about equal to the actual rotational target speed value.

21. A method of operating a machine having a front portion, a rear portion attached to the front portion via an articulation joint, and a plurality of traction devices operatively coupled to the front portion and the rear portion via respective axle assemblies, comprising:
sensing a rotational speed of at least one of the plurality of traction devices with a speed sensor;
sensing a rate of change of an orientation of the machine relative to an operating surface with an inertial yaw-rate sensor, wherein the inertial yaw-rate sensor is associated with at least one of the front portion and the rear portion;
determining an articulation angle between the front portion and the rear portion of the machine based at least in part on the sensed rate of change of the orientation of the machine;
determining an engagement force based on the rotational speed and the determined articulation angle, wherein the magnitude of the engagement force decreases as the magnitude of the articulation angle of the machine increases;

selectively reducing the rotational speed of the first traction device by selectively engaging a hydraulically actuated clutch assembly by selectively supplying fluid at a first fluid pressure based on the determined engagement force, wherein the hydraulically actuated clutch assembly is associated with a differential gear set disposed within the axle assembly for the first traction device;

selectively increasing the pressure of the fluid supplied to the hydraulically actuated clutch assembly to a second pressure greater than the first pressure after the clutch is initially engaged; and selectively disengaging the hydraulically actuated clutch assembly by continuously decreasing the pressure of the supplied fluid.

22. The method of claim 21, wherein the second pressure is 5% to 30% greater than the first pressure.

* * * * *